July 7, 1942.  G. L. DIMMICK  2,289,054
PHOTOCELL MONITOR FOR SOUND RECORDERS
Filed May 1, 1940
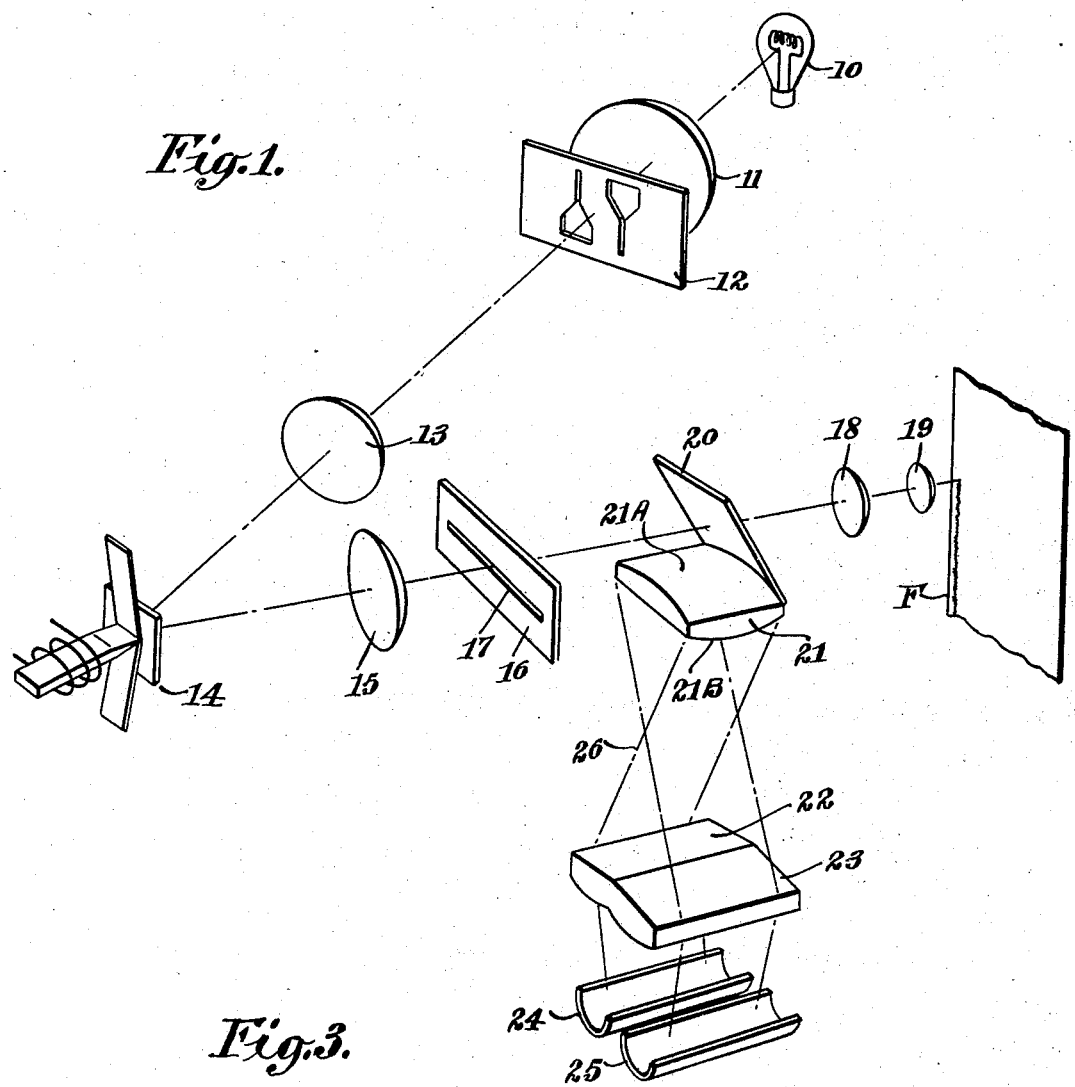
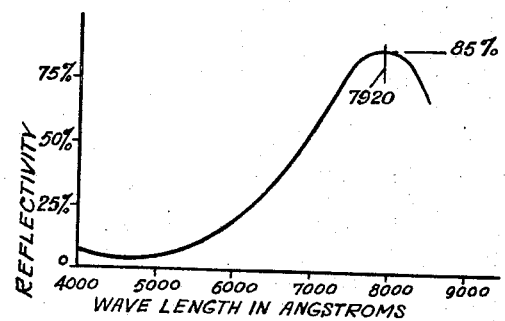
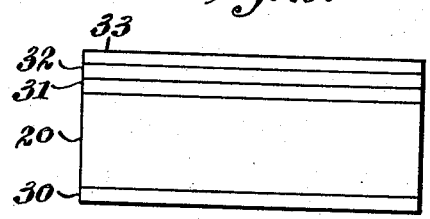
Inventor
Glenn L. Dimmick
By
Attorney Patented July 7, 1942

2,289,054

UNITED STATES PATENT OFFICE 2,289,054

PHOTOCELL MONITOR FOR SOUND RECORDERS

Glenn L. Dimmick, Haddonfield, N. J., assignor to Radio Corporation of America, a corporation of Delaware Application May 1, 1940, Serial No. 332,670

4 Claims. (Cl. 179—100.3)

This invention relates to an improved photocell monitoring device for photographic sound recording apparatus and more particularly to an improvement in the optical system used for directing a portion of the recording light beam onto the photocell. It has been heretofore proposed to provide a diagonal mirror in the light beam of a photographic sound recorder for directing a portion of the recording beam onto an appropriate monitoring device which could be either visual or photoelectric. Such devices had the general disadvantage that considerable light loss occurred at the reflecting surface. If a plane parallel piece of glass was used as the reflector, it reflected about ten percent of the beam onto the monitoring device. If this amount of light were not sufficient for proper monitoring, the reflecting surface was lightly silvered or aluminized, thereby reflecting a greater quantity of light to the monitoring device but correspondingly decreasing the quantity of light incident upon the record film.

It was proposed by L. T. Sachtleben in application Serial No. 327,759, filed April 4, 1940 to use polarized light in recording and to use the beam of light reflected by the polarizing prism for monitoring purposes. Such an arrangement effects a considerable saving of light when polarized light is to be used for recording in that the monitoring device does not decrease the light intensity below that determined by the polarizing device. It is not always desirable to use polarized light in recording particularly since the polarization itself involves a loss of about half the light. It is, however, desirable on some occasions to use light of particular colors or wave lengths for recording as described and claimed, for example, in my application Serial No. 76,901, filed April 29, 1936. The apparatus of the present invention includes a reflector which transmits substantially all of the light of a predetermined wave length which is to be used for making the sound record and reflects substantially all of the light which is most effectively used in monitoring, thereby securing the highest possible efficiency both in the recording and in the monitoring. This result is accomplished by the use of a reflector having on its surface a plurality of very thin layers of transparent material so arranged that the interference effects between the surfaces of the layers produce the desired transmission and reflectivity. It is possible, although not as effective, to use other types of dichroic reflectors. For example, a very thin layer of silver will reflect visible light and transmit only ultra violet, a thin layer of gold will transmit green and reflect orange-red, and a layer of eosin will transmit red and reflect green. The latter dichroic reflectors are not nearly as satisfactory as the first type referred to as the light losses are considerably greater.

One object of the invention is to provide an improved apparatus for monitoring the recording of photographic sound records.

Another object of the invention is to provide an apparatus which will transmit a high percentage of the light to be used in recording and which will deflect to a monitoring device a high proportion of the light which is not desired for recording.

Other and incidental objects of the invention will be apparent to those skilled in the art from a reading of the following specification and an inspection of the accompanying drawing, in which Figure 1 is a perspective view of the arrangement of the optical elements in an apparatus constructed according to the invention, Figure 2 is a greatly enlarged edge view of a reflector, and Figure 3 is a curve showing the optical characteristics of the specific reflector preferred.

The arrangement shown in Fig. 1 illustrates the application of the invention to the type of recording optical system commercially used in RCA Photophone recording equipment. In this recording optical system, light from an exciter lamp 10 is directed by the condenser 11 through the aperture plate 12. Lens 13 focuses the light on the galvanometer mirror 14 and in conjunction with the condenser lens 11 forms an image of the filament of the light source 10 on the galvanometer mirror. The lens 13, together with the lens 15, forms an image on the slit plate 16 of the apertures in the plate 12. The portion of the light which is to be recorded on the film passes through the slit 17 in the plate 16 and is focused by the objectives 18 and 19 upon the film F.

The dichroic reflector 20 is located along the optical axis between the slit plate 16 and the objective 18 and is at such an angle as to reflect the selected portion of the light beam into the lens 21 having two crossed cylindrical surfaces 21A and 21B. The lens 21A in combination with lens 15 produces an image of the galvanometer mirror 14 in the plane indicated at 26 by the cross of the marginal rays. The lens 21B produces an image of slit 17 at the photocell cathodes 24 and 25. The light splitting lenses 22 and 23 produce separated images of the plane 26 on the photocell cathodes 24. The purpose of the lens surface 21B which is cylindrical is to produce variable intensity modulation at the photocell cathodes 24 and 25. If the axis of the cylinder 21B were optically parallel to the slit 17, then a narrow light beam of high intensity would be thrown on the cathodes of the photocells 24 and 25. This is undesirable on account of the characteristics of the photocells. In order to overcome this difficulty and produce a larger area of lower intensity, the axis of the lens surface 21B is rotated so that it is about 12° off from the slit axis. This increases the light beam area on the cathodes 24 and 25 about 20 or 30 times without changing the relation between the galvanometer deflection and the intensity on the photocell. It will be apparent that two separate lenses may be used instead of the surfaces 21A and 21B.

Although this monitoring system is shown as applied to a push pull recorder, it will be apparent that the use thereof is not limited to such recording apparatus. For example, if it is desired to make a variable density record, an appropriate optical system can be substituted and a single photocell used or the photocell cathodes 24 and 25 can be connected in parallel instead of being connected in push pull as described above. Likewise, any other desired type of aperture may be substituted for the push pull aperture 12 with a corresponding change in the connections or arrangements of the photocells. If push pull recording is not to be used, it will be obvious that a single photocell may be used instead. The output from the photocells 24 and 25 may be amplified through any customary type of amplifier and it can then be listened to by appropriate earphones or loudspeakers or it may be examined by means of a cathode ray oscillograph, as desired.

Since the film on which the record is to be made is preponderantly sensitive to blue and is not particularly sensitive to the red, while the usual caesium photocell is highly sensitive to red, the reflector 20 preferably transmits a large proportion of the blue and violet and reflects a correspondingly large proportion of the red light, as shown in the characteristic curve of Fig. 3. Such a reflector is produced as follows:

A glass plate 20 is provided which is of any appropriate thickness. The plate should be accurately surfaced so as not to produce any errors in the image on the film and is preferably thin enough so as not to produce any deviation from the image of the optical axis of the system. On the rear surface of this glass plate 20 there is evaporated a thin film 30 preferably of calcium fluoride which has an index of refraction of 1.25 and an optical thickness of a quarter wave length of the blue light which is to be transmitted, which wave length, as indicated in Fig. 3, is of the order of 4400 Angstrom units $(\mu\mu)$. This reduces the reflection from the rear surface of the plate 20 substantially to zero for the selected wave length when the plate 20 is made of spectacle crowned glass having an index of refraction of substantially 1.532. The front surface of the reflector, which is the selectively reflective surface, is first coated with a layer 31 of zinc sulphide which is evaporated onto the glass. This layer has an index of refraction of 2.3 and has a thickness of a half wave length at 4400 $\mu\mu$. On top of this, there is evaporated the layer 32 of calcium fluoride having an index of refraction of 1.25 and an optical thickness of a quarter of a wave length at 4400 $\mu\mu$. A third film 33 of zinc sulphide is then evaporated on the surface, which, like the first film, has an index of refraction of 2.3, and an optical thickness of a half wave length for the blue light of 4400 $\mu\mu$. This arrangement of transparent layers gives an extremely high transmission for the blue light referred to but causes almost total reflection, i. e., eighty-five percent at a wave length of 7920 $\mu\mu$.

It will be apparent to those skilled in the art that the invention is not limited to the use of substances above mentioned, but that other transparent materials of appropriate index of refraction may be substituted therefor. The thickness of the materials and the order of their indices of refraction should be maintained substantially as described above in order that the interference effects between the internally reflected light rays may cause a high transmission in the desired wave length and a high reflection in the wave lengths which are to be directed to the monitor device.

As pointed out above, other types of dichroic filters may be substituted for that just described but their efficiency is so much lower that they are not nearly as desirable.

Having now described my invention, I claim:

1. In combination with a sound recording optical system, a monitoring device, and a dichroic reflector located in the light path of said optical system transmitting light of the wave length desired for recording and reflecting light of the other wave lengths to said monitoring device, said dichroic reflector including a transparent support carrying a plurality of transparent layers of different indices of refraction and of such thicknesses as to secure the selective transmission required.

2. In combination with sound recording apparatus including a light source, light modulating means, and means for directing modulated light to a sound record surface, a dichroic reflector in the path of said modulated light, transmitting light of the wave length to be used in recording, and monitoring means in the path of the light reflected by said reflector, said dichroic reflector including a transparent support carrying a plurality of transparent layers of different indices of refraction and of such thicknesses as to secure the selective transmission required.

3. In combination with a sound recording optical system, a monitoring device, and a dichroic reflector located in the light path of said optical system transmitting light of the wave length desired for recording and reflecting light of other wave lengths to said monitoring device, said dichroic reflector including a transparent support carrying on one surface a plurality of transparent layers of different indices of refraction and of such thicknesses as to secure the selective transmission required, and carrying on its other surface a transparent layer of such thickness as to prevent reflection.

4. In combination with sound recording apparatus including a light source, light modulating means, and means for directing modulated light to a sound record surface, a dichroic reflector in the path of said modulated light, transmitting light of the wave length to be used in recording, and monitoring means in the path of the light reflected by said reflector, said dichroic reflector including a transparent support carrying on one surface a plurality of transparent layers of different indices of refraction and of such thicknesses as to secure the selective transmission required, and carrying on its other surface a transparent layer of such thickness as to prevent reflection.

GLENN L. DIMMICK.